C. A. WENDELL.
AUTOMATIC SAMPLING DEVICE.
APPLICATION FILED DEC. 23, 1914.

1,223,544.

Patented Apr. 24, 1917.
4 SHEETS—SHEET 1.

Witnesses:
Geo C Lawson
C. J. Meaney

Inventor
Carl A Wendell
By. C C Linthicum
Atty.

NORRIS PETERS, INC., LITHO., WASHINGTON, D. C.

C. A. WENDELL.
AUTOMATIC SAMPLING DEVICE.
APPLICATION FILED DEC. 23, 1914.

1,223,544.

Patented Apr. 24, 1917.
4 SHEETS—SHEET 2.

Witnesses:
Fred C. Dawson
C. F. Murray

Inventor
Carl A. Wendell
By C. C. Linthicum
Atty.

NORRIS PETERS INC., LITHO., WASHINGTON.

C. A. WENDELL.
AUTOMATIC SAMPLING DEVICE.
APPLICATION FILED DEC. 23, 1914.
1,223,544
Patented Apr. 24, 1917.
4 SHEETS—SHEET 3.
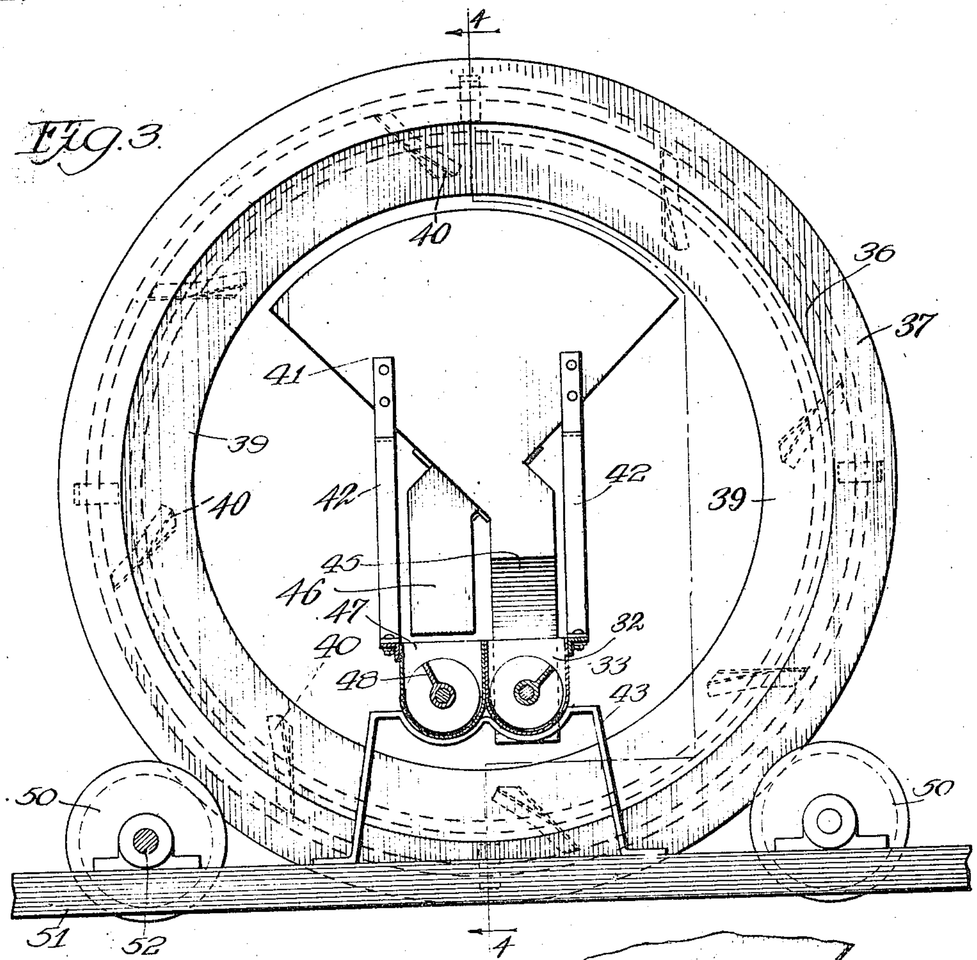
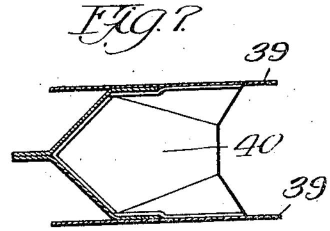
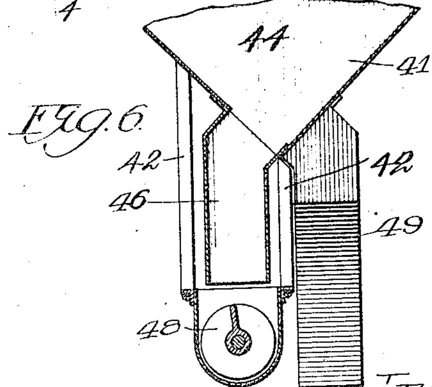
Witnesses:
Inventor
Carl A. Wendell
By. C. C. Linthicum
Atty.
NORRIS PETERS INC. LITHO., WASHINGTON D. C.

C. A. WENDELL.
AUTOMATIC SAMPLING DEVICE.
APPLICATION FILED DEC. 23, 1914.
1,223,544.
Patented Apr. 24, 1917.
4 SHEETS—SHEET 4.
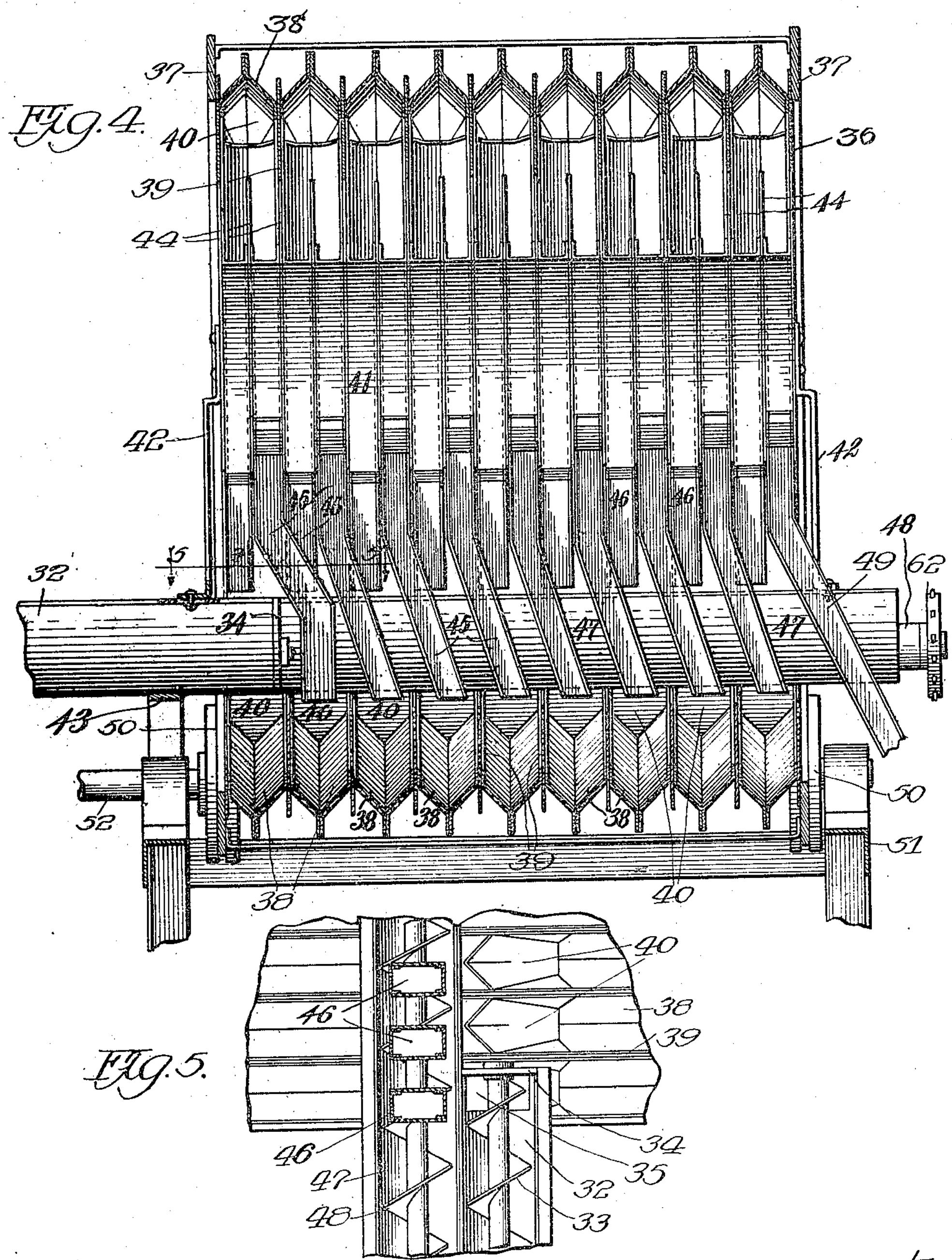
Witnesses:
Fred C. Lawson
C. F. Murray
Inventor
Carl A. Wendell
By C. C. Linthicum
Atty.
NORRIS PETERS, INC., LITHO., WASHINGTON, D. C.

UNITED STATES PATENT OFFICE.

CARL A. WENDELL, OF JOLIET, ILLINOIS.

AUTOMATIC SAMPLING DEVICE.

1,223,544. Specification of Letters Patent. Patented Apr. 24, 1917.

Application filed December 23, 1914. Serial No. 878,712.

*To all whom it may concern:*

Be it known that I, CARL A. WENDELL, a citizen of the United States, and resident of Joliet, in the county of Will and State of Illinois, have invented certain new and useful Improvements in Automatic Sampling Devices, of which the following is a specification.

My invention relates to automatic sampling devices and has particular reference to a novel construction and arrangement of parts by means of which a desired result may be secured.

In plants which handle or utilize large quantities of granular material such as ore, coal, grain, etc., it is essential that samples of material so handled shall be selected and preferably these samples should represent the general run of the material without regard to the quality of any limited or segregated portion thereof. In order to secure the requisite samples by the aid of manual labor it would be necessary to employ a large number of men and the result in that case would be more or less unsatisfactory.

I have designed a machine by means of which a small quantity of material may be removed automatically from the run of such material over a conveyer or the like; then automatically reduce the amount of such selected sample to a minimum, the final result being a sample representing very many quantities of material each of which has been removed from a different portion of the conveyed mass thereof, the sample representing in aggregate the quality of the run as a whole.

I am aware that many machines have been designed for accomplishing this result each thereof having certain objections which are sought to be overcome in this device. An advantage in the construction of the present device is that it requires no attention on the part of an operator. It stops its operation when the conveyer for the material stops; it is operated at the same speed as the speed of the conveyer; it selects a sample at short intervals in the travel of the mass, then reduces this sample in geometrical progression until the final sample is infinitely smaller than that originally selected but which represents accurately the material from which it was selected.

The invention will be more readily understood by reference to the accompanying drawings, wherein, Figure 1 is a side elevation of a conveyer belt with my novel sampling mechanism associated therewith;

Fig. 3 is an end view of the separating drum and distributing hopper;

Fig. 4 is a vertical section on the line 4—4 of Fig. 3;

Fig. 5 is an enlarged fragmentary section on the line 5—5 of Fig. 4, the spouts 45 being omitted.

Fig. 6 is a fragmentary view of a portion of the distributing hopper and return screw, and, Fig. 7 is an enlarged detail of one of the buckets in the drum shown in Fig. 3.

Figure 1:
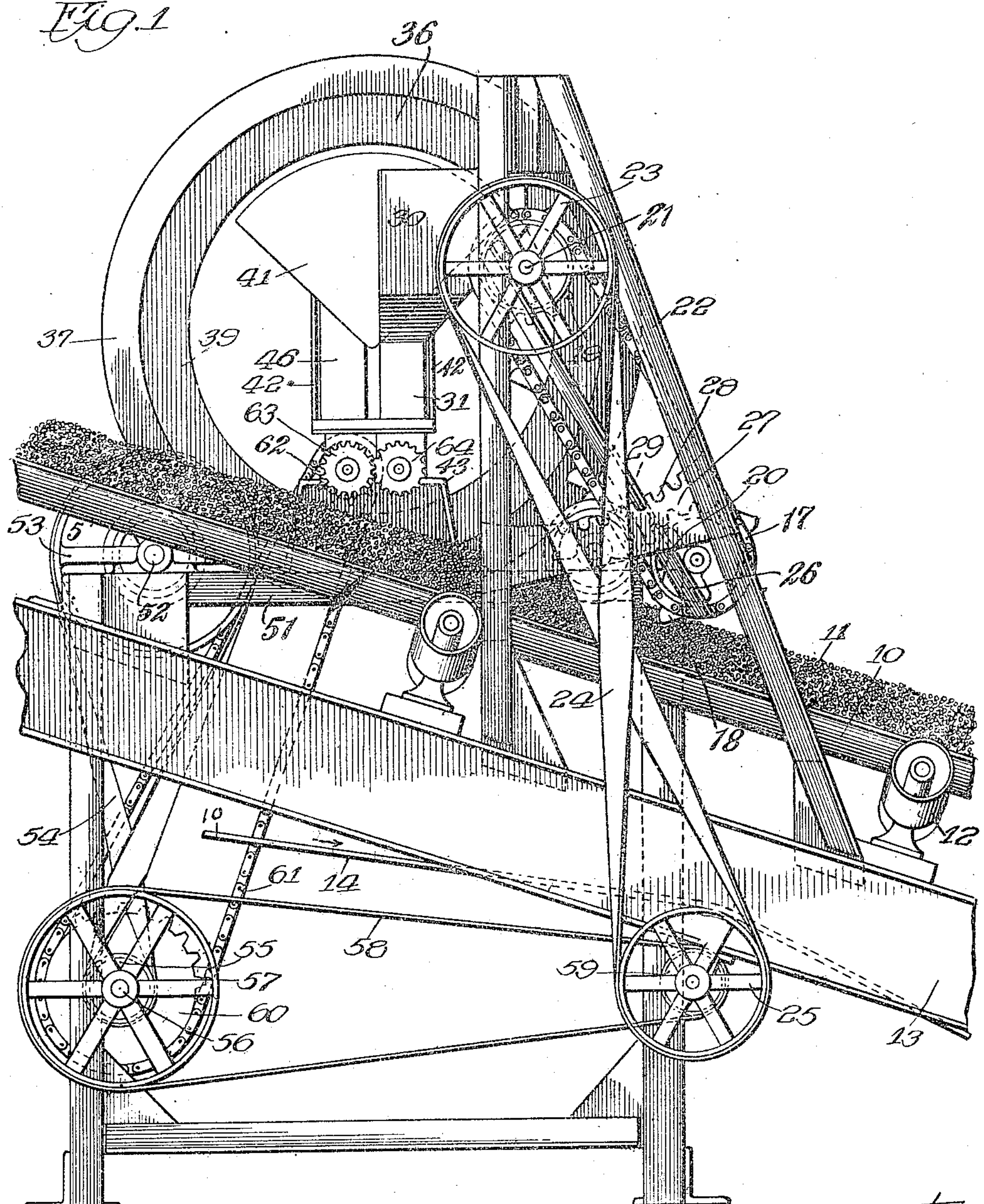
Figure 2:
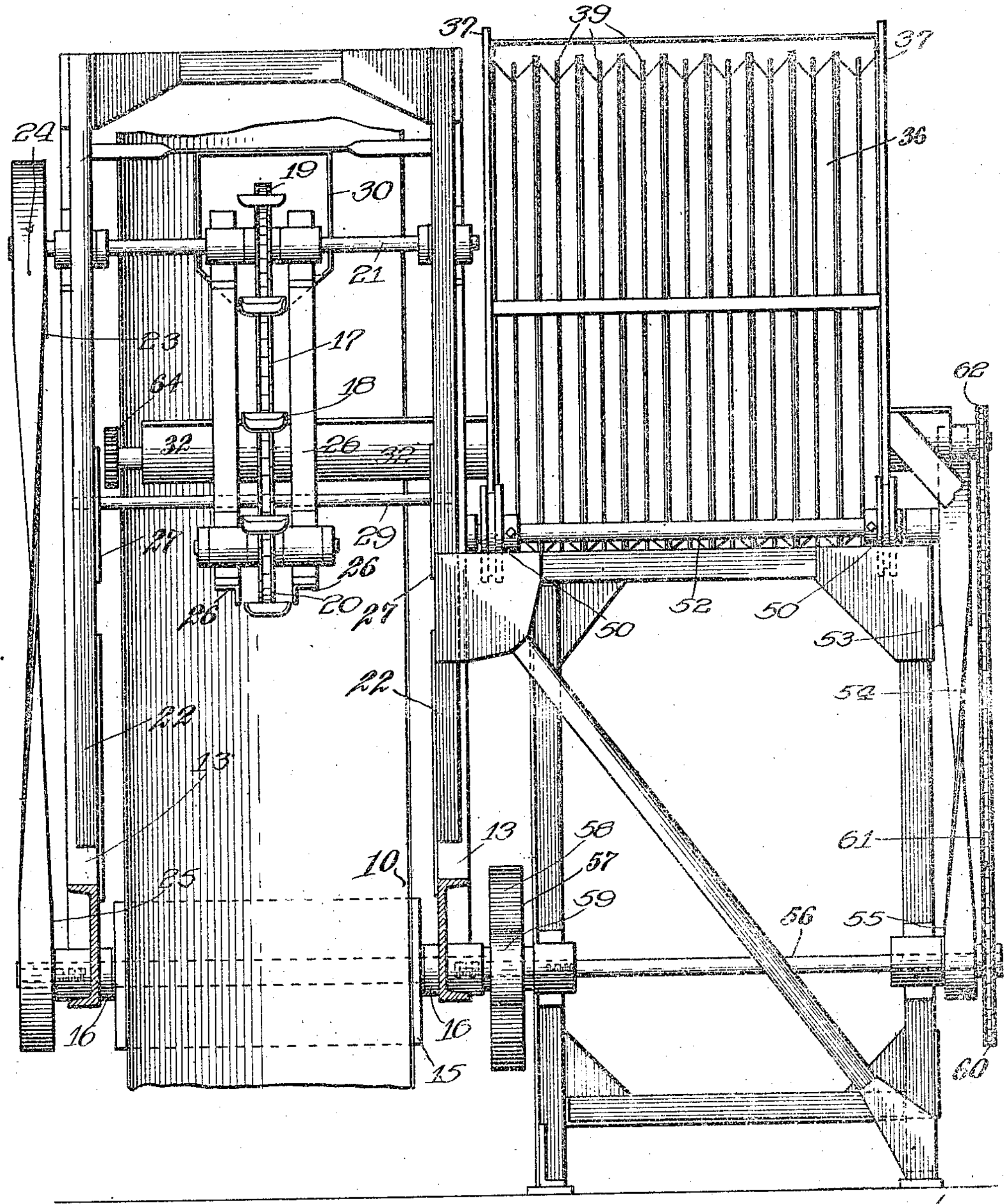
Fig. 2 is a front elevation of the same.

Referring more particularly to the drawings it will be seen that a conveyer 10, is provided by means of which material 11, such as coal, ore, etc., is transferred from a lower to a higher point, the conveyer in this instance being of the belt type and supported on rollers 12, mounted on inclined beams 13. The idle or return portion of the conveyer 10, is indicated at 14. This return portion 14, is supported upon and imparts motion to a drum 15, mounted on a suitable shaft in the bearings 16, Fig. 2 located in the beams 13. This drum supplies the motive power for actuating the sampling device and it will be apparent that the action of the sampling device is therefore synchronous with the travel of the material. As a means for selecting successive samples from the moving mass of material I provide a small lifting conveyer of the bucket type, as best shown in Figs. 1 and 2. This conveyer includes a chain 17, having buckets 18, located at intervals thereon, the chain operating on upper and lower sprockets 19, 20, respectively. Sprocket 19, is fixed on a shaft 21, supported in bearings in a triangular frame 22, the overhung end of the shaft 21, carrying a pulley 23, connected by a belt 24, to a pulley 25, fixed to and operating with the drum 15. The lower sprocket 20, is carried on a shaft, which is supported by a pair of arms 26, loosely pivoted at their upper ends to the shaft 21. Thus it will be seen that the arms 26, and therefore the elevating conveyer, are adapted for oscillation with the shaft 21 as a pivot. Carried by the frame members 22, are plates 27, each thereof having a notched arcuate upper edge, the notches being indicated at 28. A rod or bar 29, rests beneath the arms 26, with its ends engaging the notches 28, this being the means employed for regulating the height of the conveyer and therefore the quantity of material removed from the surface of the conveyer 10.

Located contiguous to the upper end of the bucket conveyer 18, is a hopper 30, best shown in Figs. 1 and 2, this hopper being so located as to receive material elevated by the buckets. The spout 31, of the hopper leads the material into a trough 32, within which a screw conveyer 33, is located. As best shown in Fig. 5, this trough and conveyer terminate at the wall 34 and the material is delivered through the opening 35, formed in the trough. Such material is delivered into the first section of the drum 36. This drum, as best shown in Figs. 4, 5 and 7, is composed of outer rings 37, and an intermediate cylinder. The cylindrical portion is corrugated or formed in such manner as to provide annular grooves 38, triangular in cross section, each two thereof being separated by an annular ring 39, at intervals in which triangular grooves, buckets 40 are provided, these being best shown in Figs. 3, 5 and 7. The material as it passes out the opening 35, in the trough 32, drops into the first groove 38, and is carried upward by one of the buckets 40. At the top of the drum the material is dumped into a hopper 41, suitably supported on the standards 42, which rest indirectly on the supports 43. This hopper is located within the drum and is divided into a large number of sections the division being formed by means of the plates 44. As shown, these plates may have an arcuate upper surface coresponding to the arc of the interior of the drum, the division plates 44, being of the same contour as the plates, which outline the sides of the hopper. It will be noted that the alternate plates 44, which serve to divide the hopper into sections, are located in such manner with relation to the grooves 38, in the drum that they bisect such grooves and that therefore material which is elevated by the buckets 40, is dumped into the hopper 41, and halved, that is, half of the material carried by each bucket is delivered to one side of a plate 44, and half to the other side. Located at the lower end of each alternate section in the hopper are spouts 46, which are arranged to deliver rejected material into the trough 47, while the remaining sections are each provided with a spout 45, which delivers material into the next adjacent section or groove 38 of the drum.

The material delivered into the trough 47, is transferred by means of a screw 48, to a point on the conveyer belt 10, which is above the point from which the original sample was taken. The material which passes downward through the spout 45, into the next section or groove of the drum is again carried upward by a bucket or flight 40, and similarly halved, one half being delivered into the succeeding section of the drum and the other half into the trough 47. This halving operation continues throughout the nine sections of the drum, the final result or sample which is delivered through the spout 49, being a relatively infinitesimal portion of that from which the sample was taken.

In other words, the material originally removed has been halved eight times with the result that if eighteen hundred pounds is removed per hour as a sample, only seven pounds per hour will be delivered through the spout 49. In an eight hour day there will thus be fifty-six pounds removed as a sample, this representing over seven tons of material originally taken as a sample. As these original samples have been taken at intervals of not over a foot from the mass of material it will be seen that the general run of material is accurately represented by fifty-six pounds removed as a sample.

The drum 36, is supported on peripherally grooved rollers 50, supported in suitable bearings on a frame member 51. The roller 50, indicated at the left in Fig. 3, is mounted upon a shaft 52, which carries at one end a pulley 53, connected by a belt 54, to a pulley 55, mounted on a shaft 56. This shaft likewise carries a pulley 57, supporting a belt 58, which engages a smaller pulley 59, mounted on or connected to the shaft which supports the drum 15. The shaft 56, carries at its outer end a sprocket 60, which is connected by means of a chain 61, to a sprocket 62, best shown in Figs. 2 and 4, which sprocket is keyed to and operates the screw conveyer 48. At the opposite end this conveyer is provided with a gear 63, meshing with the gear 64, fixed to and operating the screw conveyer 33. It will be seen that by this arrangement the screw conveyers operate in opposite directions, the conveyer 33, transferring material toward the drum and the conveyer 48, conveying it from the drum.

From the description it will be seen that the apparatus is extremely simple and cannot readily become out of repair; that its operations are entirely automatic and require no attention on the part of an operator; that it will remove separated samples from a large body of material automatically, dividing such samples continuously until a relatively small portion of the original sample remains; this sample representing accurately the run of material from which it was removed.

It will be noted that the hopper is mounted on the standards 42, and that these standards are secured to the trough 32, by means of a bolt which passes through a slotted opening in the trough, as best shown in Fig. 4. By this means the hopper may be shifted sidewise and any division of the material secured other than that herein described.

It will be noted that the material from which samples are to be taken is shown as being continuously moved by means of the conveyer 10. Mounted above and operable in timed relation to said conveyer is the endless chain 17, having the buckets 18 thereon. The material raised by the buckets 18 is dumped into the hopper 30, through which it passes to the screw conveyer 33. The material is then discharged into the first of the grooves 38 of the drum, one of the buckets 40 of which raises the material to the top of the drum and dumps it into the hopper 41, the plates 44 in which serve to divide the material, one-half of which is directed through the spout 46 into the return screw conveyer 48, and the other half into the next succeeding groove 38 of the drum. The material is then raised by a bucket in the last-named groove and again halved, or subdivided, one portion of which is directed into the return conveyer and the remainder into the next succeeding groove of the drum.

I claim:

1. In combination, means for moving a body of material, means for removing and transporting measured quantities of material being moved, a drum to which the removed material is transported, a distributing hopper, and means associated with said hopper and drum for automatically and progressively reducing the quantity of the material so selected.

2. In combination, means for continuously moving a body of material to be tested, means for selecting and transporting fractional portions of said material, a drum to which the selected material is transported, a distributing hopper, and means associated with said hopper and drum and adapted to progressively divide the samples so selected.

3. In combination, means for continuously moving a body of material to be tested, means for selecting and transporting fractional portions of said material, a drum to which the selected material is transported, a distributing hopper, means associated with said hopper and drum and adapted to progressively halve the samples so selected, and means for returning the unused portion of said sample to the body of material at a point removed from that at which the sample was selected.

4. In a sampling device, the combination of means for supplying thereto samples of the material to be tested, a rotary element having a plurality of series of buckets, to the first of which series said samples are supplied and by means of which said material is elevated, said series of buckets being in adjacent positions on said rotary member, a distributing hopper having at least two sections into each of which sections a portion of the material elevated by said buckets is received, the material received in one section being rejected, and that received in another section being delivered to an adjacent bucket, and means for causing the movement of said rotary member.

5. In a sampling device, the combination of means for supplying thereto samples of materials to be tested, and means for successively dividing said samples in geometrical progression, said last named means including a drum carrying adjacent series of buckets, a distributing hopper, said hopper being so arranged as to divide the sample into at least two parts, and means to return one part to an adjacent series of buckets in said drum.

6. In an automatic sampling device, the combination of means for selecting and conveying samples of the material to be tested, a drum to which the samples are conveyed, said drum having a plurality of series of buckets located in juxtaposition, a hopper, said hopper being divided into a plurality of sections, each section having an outlet, the material delivered to one section being delivered through its outlet to an adjacent section of the drum, and that delivered to another section of the hopper being rejected.

7. In a sampling device, the combination of a conveyer for moving a body of material to be tested, means for selecting samples from separated portions of said material and for delivering said samples to the halving device, a drum and a hopper included in said halving device, said drum being provided with adjacent series of buckets, said hopper being located within said drum, and means associated with said hopper for dividing successive samples into halves rejecting one-half and retaining one-half for further division.

8. In a sampling device, the combination of means for continuously moving a body of material, means for selecting and transporting measured samples of the material being moved, means whereby the selecting means may be adjusted for varying the quantities of the material so selected, a drum to which the samples are transported, a distributing hopper, and means associated with said hopper and drum for progressively reducing the quantity of the material so selected, substantially as described.

9. In a sampling device, the combination of means for continuously moving a body of material to be tested, means operable in timed relation with said material-moving means for selecting and transporting measured samples from the body of material being moved, a drum having lifting flights and to which the samples are transported, and a hopper having a plurality of sections into each of which sections a portion of the material elevated by said flights is received, the material received in one section being rejected and that received in another section being delivered to an adjacent flight, whereby the material lifted by the flights in said drum is automatically and progressively reduced in quantity by a definite ratio, substantially as described.

10. In a device of the class described, the combination of a conveyer by means of which material is continuously moved, means operable in timed relation to said conveyer for removing and transporting measured samples of the material being conveyed, a plurality of elevating devices arranged in juxtaposition, means for delivering the samples selected to the first of said elevating devices, and a hopper having a pair of sections associated with each elevating device, the sections being arranged whereby a portion of the material selected is received by one section and is rejected and another portion is received by the second section and delivered to the next succeeding elevating device, substantially as described.

11. In a device of the class described, the combination of means for supplying measured samples of the material to be tested, a plurality of elevating devices arranged in juxtaposition, means for delivering the samples selected to the first of said elevating devices, and a hopper having a pair of sections associated with each elevating device, the arrangement being such that a portion of the material is received by one section and is rejected and another portion is received by the second section and delivered to the next succeeding elevating device, substantially as described.

12. In a device of the class described, the combination of means for supplying measured samples of the material to be tested, a plurality of elevating devices arranged in juxtaposition, means for delivering the samples selected to the first of said elevating devices, a hopper having a pair of sections associated with each elevating device, and means for varying the relative proportions of material accepted by the sections, substantially as described.

13. In a device of the class described, the combination of a conveyer by means of which a body of material is continuously moved, a bucket conveyer so mounted that the buckets thereof engage the material on said conveyer, a drum having a plurality of series of flights on the inner surface thereof, means for moving the material selected by said buckets to the first of said series of flights in said drum, and a pair of chutes associated with each of the series of flights in said drum, said chutes being so arranged that a portion of the material lifted by said flights is rejected and another portion delivered to the next succeeding series of flights in said drum, substantially as described.

14. In a sampling device, the combination of means for moving a body of material to be tested, means for removing measured quantities of the material being tested, said last named means including an endless chain having buckets thereon, means for transporting said measured quantities to the first series of buckets of the distributing drum, a distributing drum provided with a plurality of series of buckets, said series of buckets being placed in juxtaposition, a hopper associated with said drum, and division plates in said hopper, each alternate division plate intersecting one of said series of buckets, the material falling on one side of said division plates being rejected, and that falling on the other side being delivered to an adjacent series of buckets, substantially as described.

CARL A. WENDELL.

Witnesses:
THOMAS J. SAMPSON,
WILBUR C. FRY, Jr.

Copies of this patent may be obtained for five cents each, by addressing the "Commissioner of Patents, Washington, D. C."